March 16, 1937.   W. F. ZIMMERMANN   2,073,917
CUTTER POSITIONING DEVICE FOR HOBBING MACHINES
Filed Dec. 18, 1935   3 Sheets-Sheet 1
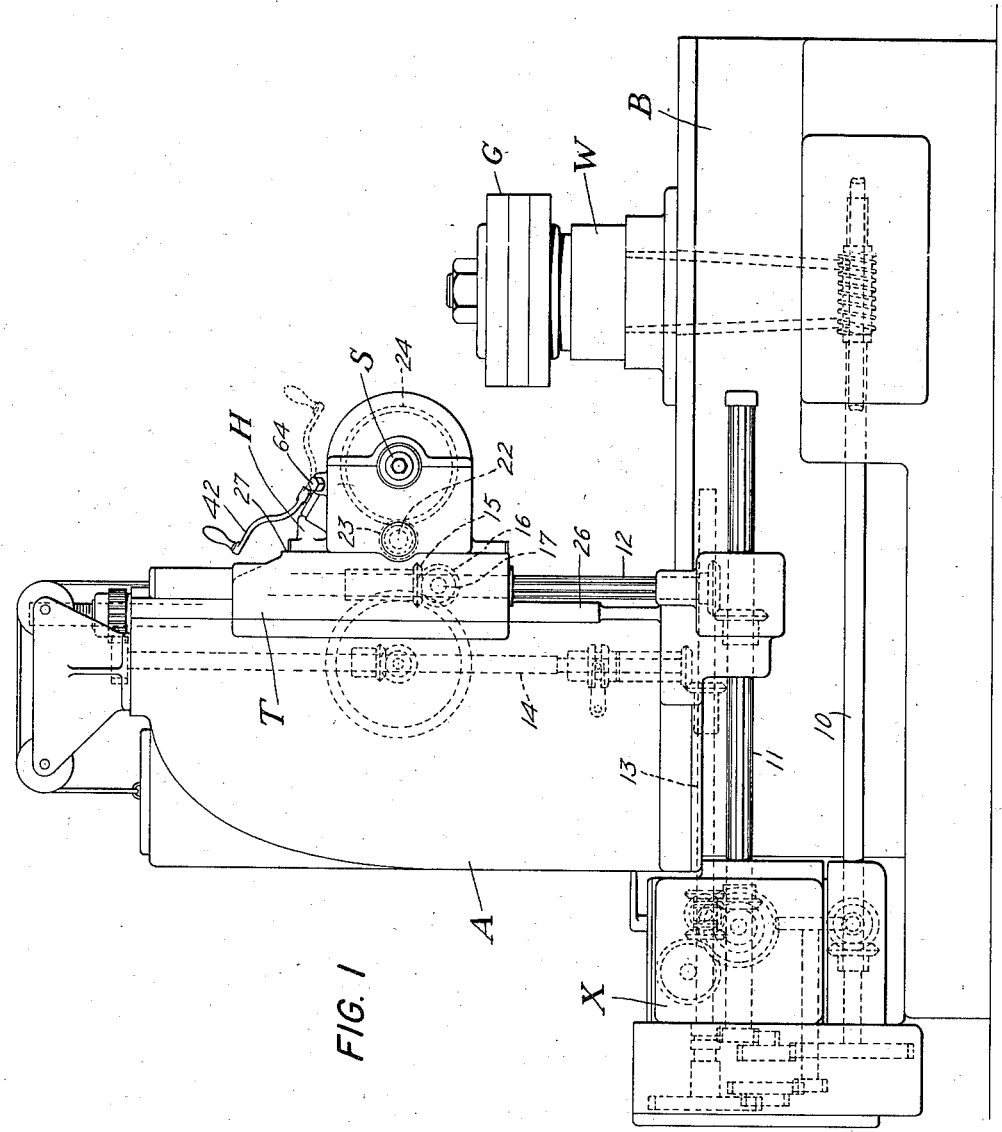
INVENTOR
William F. Zimmermann
BY
Albert F. Nathan
ATTORNEY

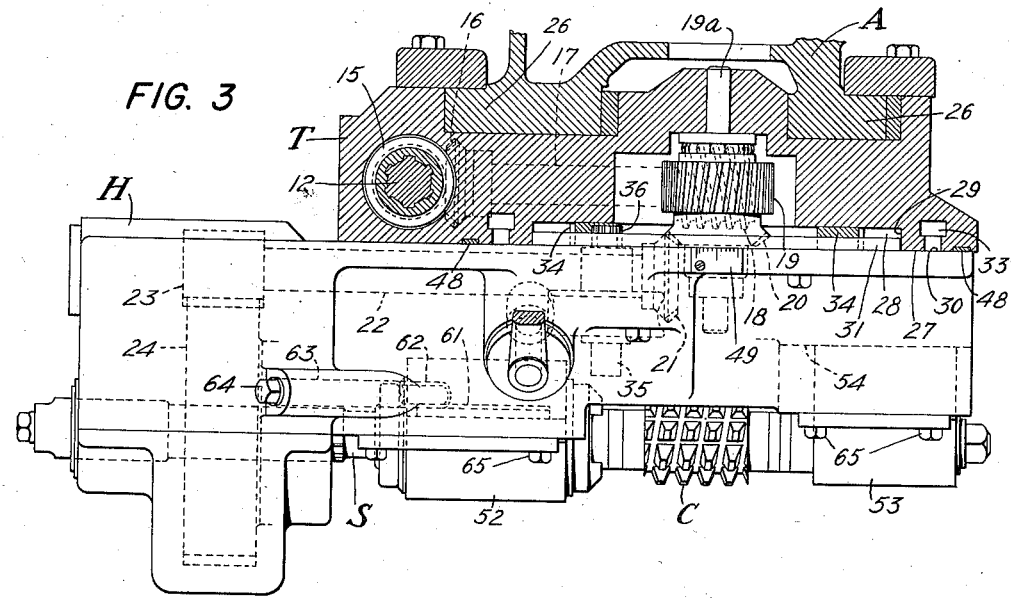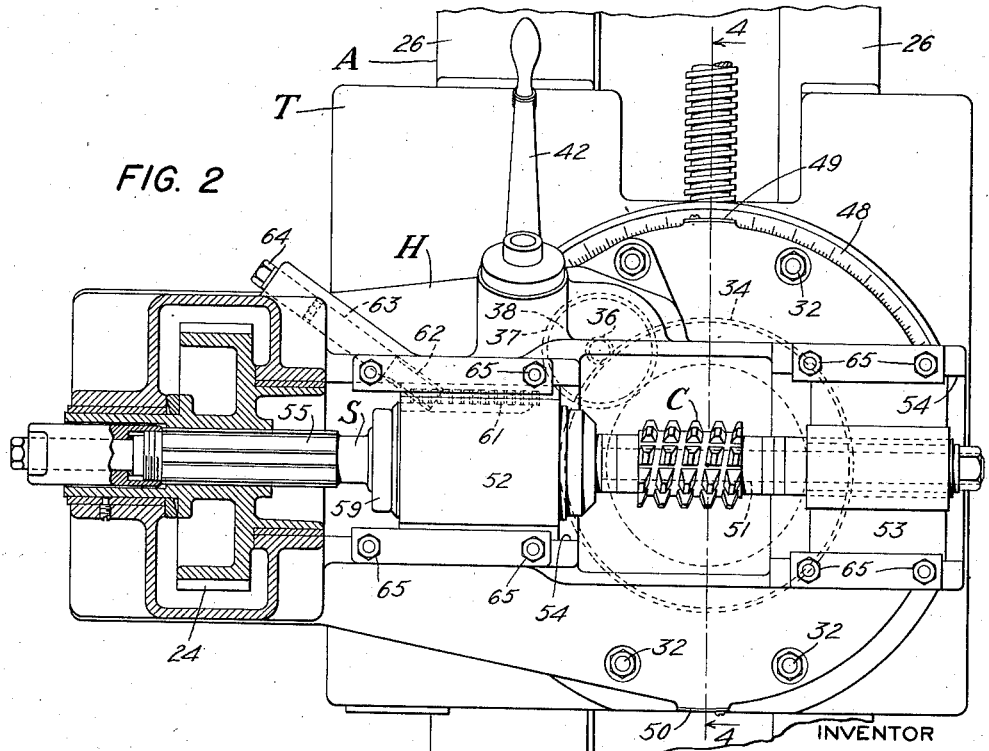

March 16, 1937. W. F. ZIMMERMANN 2,073,917
CUTTER POSITIONING DEVICE FOR HOBBING MACHINES
Filed Dec. 18, 1935 3 Sheets-Sheet 3
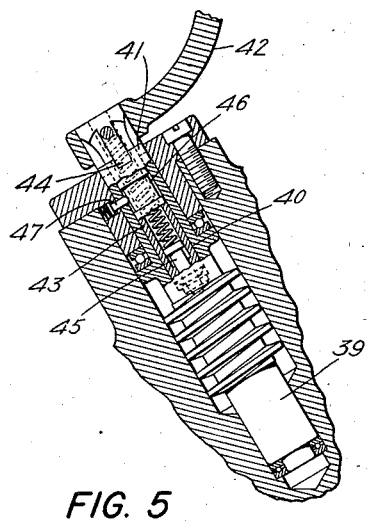
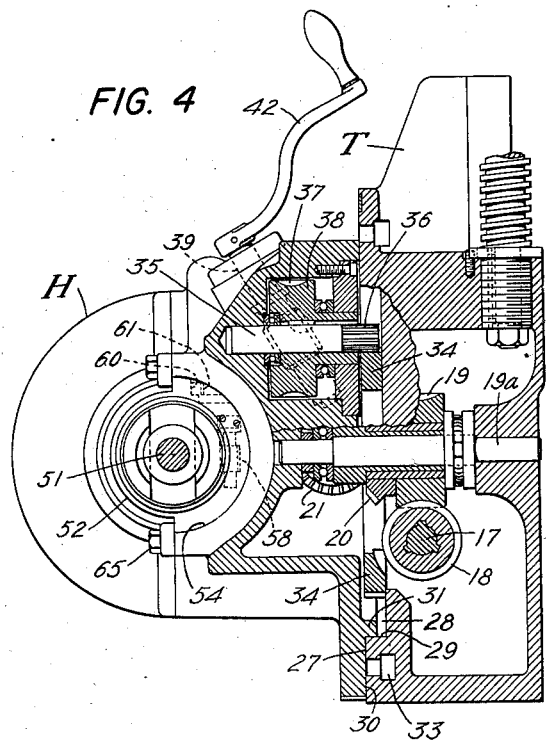
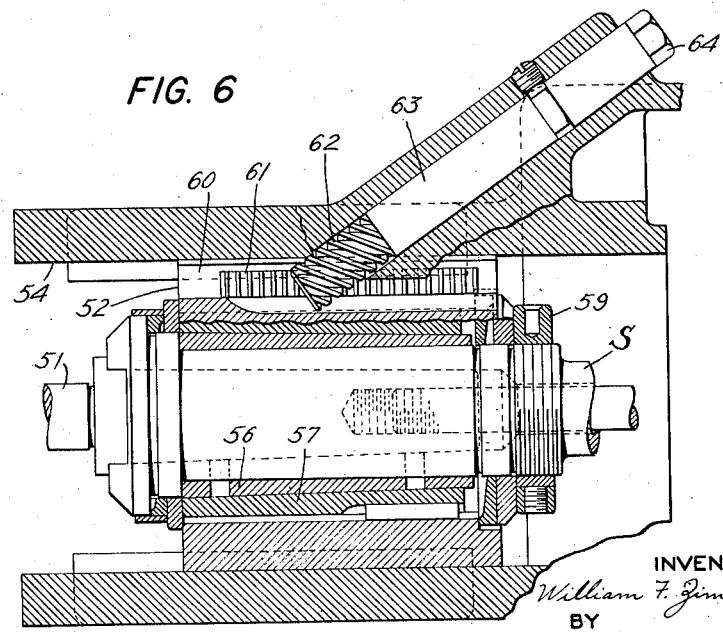
INVENTOR
William F. Zimmermann
BY
Albert F. Nathan
ATTORNEY Patented Mar. 16, 1937

2,073,917

UNITED STATES PATENT OFFICE 2,073,917

CUTTER POSITIONING DEVICE FOR HOBBING MACHINES

William F. Zimmermann, Maplewood, N. J., assignor to Gould & Eberhardt, Newark, N. J., a corporation of New Jersey Application December 18, 1935, Serial No. 54,976

11 Claims. (Cl. 90—4)

The invention relates to improvements in the control devices of hobbing machines and more particularly a system of controls for accurately and conveniently obtaining the proper angular position of the hob carrying slide and the axial position of the hob in relation to the work.

Hobbing machines of the character in which this invention is peculiarly adapted are customarily provided with a relatively long base member upon which there is mounted a translatable hob-carrying stanchion and a rotatable work carrying table. The stanchion is adapted for movement toward and away from the work table and carries on its forward side a vertically movable hob slide. In operation, one or more blanks are secured to the work table, the stanchion propelled forwardly until the hob is in the proper position with respect to the periphery of the work. The cutter slide is then fed downwardly and the hob carried thereby performs the tooling operation on the work blank. During the operation, the rotation of the hob or cutter, the rotation of the work blank, and the down feed of the hob carrier are all accurately coordinated so that exceedingly accurate and properly shaped teeth are formed upon the finished work blank.

Difficulty is experienced, however, in efficiently operating such machines and which is largely due to the time and care heretofore required in obtaining the proper angular position of axis of the hobbing spindle with regard to the type of gear being cut, i. e. spur or left or right hand helical, and the correct axial position of the teeth of the hob on that axis with relation to the workpiece. Also, in changing the position of the swiveled cutter head from a right to a left hand position, or vice versa, and in adjusting the cutter spindle unit axially in order to use different portions of the hob, considerable time was consumed heretofore in accurately making the required adjustments.

A primary aim of the present invention is to overcome the disadvantages of the prior devices and provide a means whereby hob adjustments of the above character may be quickly and easily made, irrespective of the angular position of the spindle carriage, and a structure whereby exceedingly fine and accurate adjustments may be made when desired.

A further object of the invention is to minimize and reduce to relatively low proportions the overhang of the hob and hob-carrying slide from its bearings and supporting surfaces thereby to lessen to a large degree the possibility of flexing or yielding of the parts and the incidental effect thereof upon the accuracy of the work performed upon the machine.

Still another object of the invention is to effect, when desired, a shifting of the hob axially in the swivel carriage for the purpose of accurately coordinating the axial position of the hob with respect to other cooperating mechanisms of the hobbing machine, or to change the axial position of the hob relative to the workpiece so as to present new portions of the hob to the workpiece, and by way of further refinement to prevent the cutter arbor from sliding to the floor or injuring the operator while making adjustments of this character when the cutter carriage is at an angle greater than the angle of repose of the spindle and arbor therein.

Owing to the fact that the swiveled carriage may have a left or a right handed inclined position depending upon the helix angle of the cutter, the invention further undertakes to provide an improved spindle adjusting mechanism that automatically and positively locks the spindle against untoward axial movement during adjustments thereof and also after an adjustment has been made.

In attaining the objects of this invention it is proposed to arrange a circular rack or a portion thereof, within the plane of the bearings of the swiveled spindle carriage and to journal in the swivel part of the carriage a short shaft having a gear thereon meshing with the fixed rack. The short shaft, the axis of which parallels the axis of rotation of the spindle carriage, is also provided with a portion having helical teeth adapted to mesh with helical worm teeth formed upon a secondary adjusting shaft disposed at an angle thereto. This arrangement of the adjusting mechanism, it will be observed, materially shortens the overhang of the spindle carriage as it is no longer necessary to have the rack teeth externally cut on the swivable part and operated from a stationary screw. It also overcomes a disadvantage existing in such prior constructions, in that as the adjusting screw of the present invention travels with the carriage, it is always readily accessible. The carriage may therefore be conveniently adjusted from any position to any other position whereas in prior constructions using a stationary adjusting screw, the screw was not always freely accessible and could be operated only by a laborious and time consuming ratchet operation.

As before stated a further improvement resides in adjusting means of this character whereby major and minor angular adjustments of the carriage may be quickly made without resorting to ratchet mechanisms or other tediously slow devices. That end is achieved by designing the spindle carriage in such a manner that the axis of the secondary shaft extends in a direction transverse to the axis of the pinion shaft and spindle carriage rotated thereby, so that the crank engaging end thereof extends forward out of the plane of rotation of the carriage.

This specific arrangement of the traveling adjusting shaft enables the operator to take full turns of the crank in effecting readjustments in the angular position of the carriage without interference with the non-rotatable portions thereof or with the ways on the forward face of the stanchion.

As an additional refinement the invention contemplates a special form of crank means for actuating the transversely arranged adjusting shaft. In the present embodiment, the hand crank and coacting crank shaft are provided with recessed complemental clutch elements which interengage in the making of an adjustment. The recessed or socketed feature of the clutch members affords a construction in which the crank handle will not accidently fall off the transverse shaft, and which, when removed therefrom, leaves no squared shaft projecting in space liable to catch the clothing of the attendant.

Moreover, the clutch arrangement of crank affords a construction wherein the crank may be applied and operated in a position wherein an operator may use and control his strength to the best advantage and skill in making an adjustment which is of particular importance in making the fine accurate adjustments in machines of the hobbing type.

Closely inter-related with the angular adjustment given to the spindle axis, is need for the proper axial position of the hob or cutter on that axis. Frequently, the position of the cutter must be adjusted laterally accurately to correlate the teeth thereof with the angular position of the workpiece. The cutter is also frequently shifted axially to present new portions of the teeth thereof to the work. In the cutting of gear splines etc. lateral adjustments of that character must of necessity be made very accurately and so that such adjustments may be made expeditiously, as well, it is proposed to mount the cutter spindle in axially shiftable bearings and to provide propelling means therefor in the form of a helical gear and rack. The rack element is translatable with the spindle bearings, whereas, the helical gear propelling shaft is stationary but inclined at an angle to the direction of translation. The free end of the adjusting shaft is thereby caused to project from the housing at an angle permitting ready accessibility. The inner end which has helical gear teeth formed thereon, affords in itself a non-reversible drive and a positive lock preventing untoward shifting of the spindle particularly when the latter is arranged on an inclined position and unclamped.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 of the drawings represents a typical hobbing machine incorporating this invention.

Figure 2 is an enlarged front view of the swivel slide and portions of the cutter driving and adjusting mechanism.

Figure 3 is a plan view, partly in section illustrating additional portions of the drive and adjusting mechanism.

Figure 4 is a vertical section taken substantially along line 4—4 of Fig. 2.

Figure 5 is a sectional view of the improved adjusting crank and its cooperating mechanism.

Figure 6 is a sectional view of a preferred form of arbor adjusting mechanism, with the parts reversed from their positions shown in Fig. 2 better to illustrate certain features of the automatic locking mechanism.

Referring more particularly to the hobbing machine represented in Fig. 1 of the drawings, the machine therein illustrated is of the vertical cutting type, that is, the cutter spindle in the usual set-up moves vertically downward during the cutting operation.

In machines of that character the gears G to be cut are supported directly upon a rotatable work table W whereby the stresses incident to the cutting operation are absorbed by the rigid base B. The rotation of work table W, cutter spindle S, and the down feed of the tool slide T and carriage H, are effected in timed relation by the transmission mechanism within the gear box X and base B of the machine. The horizontal shaft 10 drives the work table, the splined shafts 11 and 12 drive the cutter spindle and the shafts 13 and 14 propel the tool slide T and parts supported thereon toward and away from the work.

As illustrated in the drawings the tool slide T is mounted for vertical reciprocation upon the forward face of a translatable stanchion A, which also may be traversed or fed toward and away from the work as in infeed cutting or to obtain depth of cut, or diameter of gear as in vertical cutting. The drive to the stanchion, work table spindle, and spindle feed, together with their trip dogs and controls, follow conventional hobbing machine design and it is believed unnecessary to go into further detail. Suffice it to say that in the present embodiment of the invention the drive to the cutter spindle is taken off the splined vertical shaft 12 by means of the bevel gears 15 and 16 supported in the tool slide T.

The gear 16 drives an inwardly extending shaft 17 which carries at its inner end a worm gear 18 arranged to mesh with a worm wheel 19 positioned concentric with the axis of the swivel tool head or carriage H. A pair of bevel gears 20 and 21 transmit the motion of the worm wheel 19 to the shaft 22 which is provided at its outer end with a gear 23 meshing with a gear 24 coaxially arranged with the spindle shaft S. The hub of the gear 24 is internally splined to accommodate and drive the splined spindle S in all of its axially adjusted positions.

As here-in-above indicated the tool slide is formed of two main parts i. e. the slide T proper, and a swiveled carriage or head H, the former member being arranged for vertical travel on double rectangular guides 26 on the stanchion A, and the latter being rotatively pivoted to the slide T and movable therewith.

The carriage H, in the present embodiment, has an angular movement about its center of 180° to enable the machine to be used for cutting right or left hand helical gears of any angle.

In the hobbing of gears a great deal depends upon the setting of the hob or cutter and if great care in setting is not exercised, or if errors are allowed to creep in due to excessive over-hang or spring in the cutter mounting, defective and unbalanced tooth shapes are developed in the finished workpiece.

The present invention proposes a construction in which the over-hang of the cutter is reduced to its minimum proportions and in which the angularity adjusting mechanism therefore is conveniently accessible in all angular positions and self-locking in character after adjustments have been made.

In attaining those ends the front face of the tool slide T is provided with a relatively large flat surface 27, recessed as at 28 to provide an annular bearing surface 29 for the swivel head or carriage H. The adjacent face 30 of the swivel carriage is likewise accurately machined to engage the surface 27 of the slide T and is provided with a projecting bearing portion 31 adapted closely to fit the circular recess 29 in the slide. The complemental bearing surfaces afforded by the projecting portion and recess, provide a large diametered pivot concentric with the central worm drive shaft 19a. This large pivot and the cooperating flat surfaces 27 and 30 serve accurately to locate and maintain the swivel slide T in proper alignment. Bolts 32 and coacting annular T-slots 33 are provided for clamping the surfaces firmly together after the adjustment in angularity of the carriage has been made.

In some prior constructions, the carriage was adjusted angularly by means of a worm wheel cut on the external periphery of the carriage and arranged to cooperate with a stationary worm gear journaled in the non-rotatable slide. Such arrangements, it will be seen, necessitated a large over-hang of the swivel carriage, in addition to resolving in to a construction in which the adjusting worm could not conveniently be reached because of the obstructions offered by the carriage in certain angular positions. Moreover, the space afforded between the stationary adjusting screw and the tool slide was insufficient to allow full turns of the crank, and the carriage could therefore be adjusted only by a tedious ratchet operation. In swinging the carriage from a left to a right hand position, or vice versa, for example, the prior methods of adjustment were exceedingly slow and laborious. And because of the inaccessibility of the adjusting screw, great difficulty was experienced in making the fine adjustments accurately which is essential in machines of this character.

The present invention overcomes the disadvantages of the prior constructions by an arrangement of parts whereby the adjusting mechanism is in the plane of the pivot bearings, thus materially reducing the over-hang of the cutter, and actuated by an inclined shaft that is journaled in and carried by the swivel head. Accordingly, in any position of the head the adjusting shaft is conveniently accessible to the operator's crank, the particular incline of the shaft, enabling full and easy turns of the crank handle in all positions of the carriage.

Figures 3, 4 and 5 of the drawings illustrate a preferred method of practicing this invention and in which it will be seen a circular rack element 34 is secured to the non-rotatable slide T in the recess 28 and within the plane of the pivot bearing 29—31. A short shaft 35, journaled in the swivel carriage H, has one portion thereof provided with pinion teeth 36 adapted to mesh with the circular rack 34, and another portion provided with helicoidal worm teeth 37 in the form of worm gear 38.

The shaft 35 parallels the axis of rotation of the spindle carriage and is arranged to be propelled by an inclined helicoidal worm shaft 39.

As shown in Figures 4 and 5 the propelling shaft 39 projects upwardly and is inclined forwardly at an acute angle to the axis of rotation of the carriage and to its plane of rotation. The end of the propelling shaft is thereby caused to project forward to a position at all times accessible to the operator. The position of the shaft remains fixed relative to the rotatable carriage H and never is concealed or hidden from view, and when arranged at the proper angle, permits the operator to take full turns of the crank handle in all angular positions of the carriage without interference with the stanchion ways 26 or portions of the tool slide T.

A further improvement in the angularity adjusting means has to do with the crank end of the propelling shaft. In the prior constructions the stationary shaft usually projected a substantial distance and was provided with a squared portion adapted to receive a square wrench or crank handle. In operation, however, the projecting squared shaft in certain positions frequently was obstructed and ofttimes was in a position that the crank handle could be actuated to proper advantage.

With the present arrangement, the propelling shaft does not project from the carriage but stops short of the surface, as shown in Fig. 5. The shaft is formed with a central bore 40 and clutch teeth 41 at its end. The crank 42 is similarly provided with a hollow pilot portion 43 and clutch teeth 44 which coact with the bore 40 and teeth 41 of the shaft 39. Within the pilot portion of the crank a spring pressed plunger 45 is housed, which is adapted to engage the bottom of the bore 40 and normally maintain the complemental clutch teeth apart. And so that the crank does not accidentally fall out, a reduced portion 46 is provided intermediate the ends of the pilot shaft which coacts with a spring detent 47 and holds the crank in place, yet permitting easy removal of same. By depressing the crank the clutch teeth may be engaged, and full or partial turns may given to the adjusting shaft. In some positions of the carriage and particularly in obtaining accurate adjustments, it is important that the operator have the crank handle in its most advantageous position and without fear that the handle is going to fall off or be improperly positioned on the shaft. The present declutchable and detachable safety handle accomplishes those desired ends and at the same time affords an inexpensive construction preventing the haphazard use of improper or wrongly sized wrenches.

Associated with the swivel carriage is an annular dial plate 48 graduated in degrees and fractions thereof, and two smaller vernier plates 49 and 50, carried on the periphery of the swivel carriage at opposite sides of the axis of the hob, for indicating the angular position of the carriage. It will be noted that with two oppositely arranged verniers, the position of the carriage may be readily determined, whether the carriage is in the upper quadrant or in the lower. Also, the reading of the angle of inclination is not hindered in any way by the adjusting crank, since the axis of the latter is inclined forwardly and occupies a position removed a substantial distance from the plane of the dial.

Cooperatively related with the angularity adjusting mechanism for the cutter is the means for adjusting the cutter laterally in its bearings. Lateral adjustment of the cutter is necessary in such machines to properly position same with respect to the work and also so that with a long hob, new and different portions thereof may be presented to the work.

For that reason the cutter spindle S and arbor 51 are journaled in slidable bearing blocks 52 and 53, each of which is axially movable in ways 54 provided in the swivel carriage H. The driving end of the spindle is splined, as at 55, and slides within the complementary splined hub of the driving gear 24. The other end of the spindle S is tapered and provided with a bronze sleeve 56 that rotates in a hardened bushing 57. The bushing 57 is likewise tapered and is provided at its big end (hob end) with spindle diameter adjusting means 58, and at its small end with spindle end adjusting means 59. Thus, the original accuracy in spindle alignment may be maintained at all times.

The spindle bearings just mentioned are supported by the axially movable bearing block 52 which may be moved a substantial distance toward or away from the center of rotation of the carriage by an improved self-locking means now to be described.

At the back of the bearing block 52 a groove 60 paralleling the spindle axis is formed and within which is seated a straight rack element 61. The rack is provided with helical teeth adapted to be meshed by similar helical teeth 62 formed at the end of an inclined propelling shaft 63. The shaft 63 is also journaled in the swivel carriage and is inclined at an acute angle to the axis of rotation of the spindle and is provided with a conveniently accessible end portion 64 for the adjusting wrench, thus forming a direct acting self-locking adjusting means for the spindle.

The foregoing arrangement overcomes a problem found in conventional spur pinion and rack connections and which is, that the helicoids used in the present construction automatically self-lock and prevent the spindle, arbor, etc. from sliding out the end of the carriage, when the latter is in an inclined position. In the present construction only two parts, namely, the helicoidal rack 61 and the helical geared adjusting shaft 63 are necessary to accomplish all axial adjustments required, in a safe and easy manner.

The cutter arbor 51, upon which a cutter C is mounted, forms a rigid connection between the bearing blocks 52 and 53 and accordingly, a repositioning of the spindle bearing block 52 effects a corresponding repositioning of the block 53. After the cutter has been shifted to the precise position required, the clamp bolts 65 are tightened which securely holds the parts in position.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A hobbing machine combining a tool slide member having a centrally disposed annular recess formed in a flat forward surface thereof; a universally adjustable spindle carriage having a complemental flat surface and a centrally disposed projecting portion rotatively fitted to the walls of said annular recess in the slide and adapted for adjustment angularly thereon through 180°; means operating in said recess for rotating said spindle carriage angularly on said slide about the axis of said recess, comprising a non-rotatable rack member mounted to said slide in said recess and to the rear of the plane of the flat forward surface of said slide, a pinion shaft journaled in said rotatable carriage, a pinion thereon meshing with said rack member, a helicoidal worm gear mounted on said pinion shaft, a propelling shaft journaled in said pivotally mounted carriage and inclined relative thereto on an axis respectively transverse to the axis of rotation of said carriage and transverse to the plane of rotation thereof and extending forward to a position accessible to the operator in all angular positions of adjustment of the carriage, helicoidal gear teeth at the inner end of said shaft adapted to mesh with the teeth of said worm gear and means provided at the outer end of said shaft for receiving an actuating element for propelling same thereby to effect angular adjustment of said spindle carriage relative to said slide.

2. Spindle adjusting means for universally adjustable spindle heads of hobbing machines combining a tool slide member; a spindle supporting carriage pivoted thereto and adjustable angularly thereon; a rotatable and translatable spindle journaled in said spindle carriage on an axis perpendicular to the axis of rotation of the carriage; complemental annular bearing means between said carriage and tool slide members comprising a recessed portion provided in slide and a complemental projecting portion provided by said carriage; axially translatable bearing means for said spindle; rotating means for said carriage comprising an annular rack member mounted in the recess in said tool slide and lying within the plane of said annular bearing means, a pinion shaft journaled in and movable with said rotatable carriage, a propelling shaft also journaled in said rotatable carriage and arranged on an axis transverse to the axis of rotation of said carriage and transverse to the plane of rotation of said carriage, said propelling shaft thereby projecting forward to a position accessible in all angular positions of the carriage; and a manually operable crank means engageable with the end of said transversely arranged propelling shaft for operating same, the inclined position of said propelling shaft enabling full or partial turns of the crank to be made in all angular positions of the carriage without interference with the relatively stationary tool slide.

3. Control means for setting the axial and angular position of the cutter of a hobbing machine combining a reciprocable tool slide member; a spindle carriage pivoted thereto and adjustable angularly thereon through 180°; a rotatable and translatable tool spindle assembly journaled in said spindle carriage; a cutter on said spindle assembly; bearing means between said carriage and tool slide members and between said spindle assembly and said carriage; means for adjusting said cutter angularly and axially relative to said tool slide comprising an annular rack member fixed to said tool slide, a straight rack member fixed to said spindle assembly and translatable therewith; a pair of propelling shafts journaled in said rotatable carriage on axes respectively transverse to the axis of rotation of said carriage and transverse to the axis of said spindle, said shafts thereby extending at angles to the planes of rotation of said carriage and spindle respectively to positions accessible to the operator in all angular positions of the carriage; helicoidal gear connections between each of said shafts and each of said racks; and a manually operable means engageable with the ends of said inclined propelling shafts for operating same selectively to effect major or minor adjustments in the setting of said cutter.

4. A hobbing machine combining a rotary work spindle, a rotary tool spindle, said spindles being relatively translatable to effect a feed; a power transmission for effecting rotation and relative translation of said spindles; a tool slide; a swiveled spindle head pivoted thereto and adapted for angular movement thereon through 180° about an axis perpendicular to the axis of the tool spindle supported thereby; angularity adjusting means for said swiveled spindle head comprising a circular rack member fixed to said tool slide, a pinion gear engaging said rack, the axis of said gear being parallel to the axis of rotation of said swiveled head; a helicoidal gear operatively connected with said pinion gear, and a manually operable propelling shaft having helicoidal gear teeth thereon for actuating said helicoidal gear and pinion gear whereby the position of said cutter head may be adjusted angularly about its axis, the said propelling shaft being journaled in said swiveled head and inclined forwardly out of the plane of rotation of said swiveled head; and crank means detachably engageable with the end of said propelling shaft for actuating same, the inclination of said propelling shaft permitting accessibility and engagement of said crank means and full turns thereof in all angular positions of the swiveled head without interference with portions of the relatively stationary tool slide.

5. Cutter spindle setting means for hobbing machines combining a tool slide member; a spindle carriage pivoted thereto and adjustable angularly thereon through 180°; a rotatable and translatable spindle journaled in said spindle carriage on an axis perpendicular to the axis of rotation of the carriage; complemental bearing means between said carriage and tool slide members; axially translatable bearing means for said spindle; rotating means for said carriage and for translating said spindle bearing means relatively to the carriage comprising two rack elements, two propelling shafts journaled in said rotatable carriage and arranged on axes respectively transverse to the axis of rotation of said carriage and transverse to the axis of said spindle, said shafts thereby extending respectively at an angle to the axis of rotation of said carriage and at an angle to the axis of said spindle to positions accessible to the operator in all angular positions of the carriage; means including helicoidal gear elements between each of said shafts and its associated rack element for effecting relative movement therebetween; and manually operable crank means engageable with the ends of said inclined propelling shafts for actuating same, thereby to effect the proper setting of said spindle axially and angularly with respect to the workpiece, said helical gear elements affording a non-reversible drive and a positive lock for holding said spindle in each of its adjusted positions.

6. Cutter spindle adjusting means for a hobbing machine having a vertically movable tool slide, an angularly adjustable cutter carriage pivoted thereto on an axis perpendicular to the plane of movement of said slide, and a normally horizontal, axially adjustable, spindle journaled in said carriage, combining a circular rack element fixed to said slide concentric with the axis of rotation of the carriage; a pinion gear journaled in said carriage and meshing with said rack element; a second rack element secured to said axially adjustable spindle; a propelling shaft for each of said rack elements, each of said shafts being journaled in and movable bodily with said tool carriage and each shaft extending at an acute angle to the axis of said spindle to a position accessible to the operator in all angular positions of said carriage; and helicoidal gear connections between each of said shafts and its associated rack element, each of said connections affording a non-reversible positive self-locking drive for maintaining said spindle in adjusted position.

7. A hobbing machine combining a rotary work spindle, an axially translatable and rotatable tool spindle; a cutter mounted on said tool spindle; said spindles being relatively translatable bodily to effect a feed; a power transmission for effecting said rotation and relative bodily translation of said spindles; a tool spindle slide; a swiveled spindle head pivoted thereto for supporting said tool spindle and adapted for angular movement through 180° about an axis perpendicular to the axis of the tool spindle; means for translatably and rotatably supporting said spindle in said head; angularity adjusting means for said swiveled spindle head comprising a circular rack member fixed to said tool slide, a pinion gear journaled in said carriage and engaging said rack, and a manually operable propelling shaft for actuating said pinion gear whereby the position of said cutter head may be adjusted angularly about its axis, the said propelling shaft being likewise journaled in and movable with said swiveled head and upon an axis inclined forwardly out of the plane of rotation of said swiveled head; detachable actuating means for said propelling shaft operative in all angular positions of the swiveled head without interference with portions of the relatively stationary tool slide; and manual means for adjusting said spindle axially in said swiveled head to coordinate the axial position of the cutter carried thereby with the said rotary work spindle, comprising a helicoidal rack element translatable with said spindle, a second propelling shaft having teeth thereon engaging said helicoidal rack, said second shaft being inclined to the axis of said spindle and provided with an end portion adapted to receive an actuator, the incline of said second shaft and the inter-engagement of the helicoidal teeth affording a non-reversible self-locking drive accessible in all angular positions of adjustment of said swiveled head for translating said spindle in said swiveled head; and manually operated means for actuating said second propelling shaft.

8. In a hobbing machine having a vertically reciprocable tool slide, an angularly adjustable cutter carriage pivoted thereto and rotatable on an axis perpendicular to the plane of reciprocation of said slide, and a normally horizontal, axially adjustable spindle journaled in said carriage, the combination of means for independently adjusting the axial and angular setting of the spindle relative to said slide comprising rack and gear connections between said carriage and slide and between said carriage and said spindle; a propelling shaft for each of said gear connections, each of said shafts being journaled in and movable bodily with said pivoted carriage and each shaft extending at an acute angle to the plane of rotation of the element adjusted thereby to a position accessible to the operator in all angular positions of said carriage; each of said connections including at least two helicoidal gear mechanisms affording a non-reversible positive self-locking drive for maintaining said spindle in any angularly and axially adjusted position.

9. The combination set forth in claim 2 in which the propelling shaft is provided with a central bore and a plurality of clutch teeth at its outer end, and said crank means being provided with a hollow pilot shaft adapted to fit said bore and a plurality of clutch teeth complemental to the clutch teeth on said shaft, a spring pressed plunger within said pilot shaft adapted to engage the bottom of the central bore in the propelling shaft and normally tending to urge said complemental clutch teeth apart whereby said crank means may be manually engaged with said shaft and used selectively to impart uninterrupted revolutions to said shaft to effect major adjustments in either direction in the angularity of said carriage, or intermittent part revolutions to said shaft to effect fine adjustments in either direction in the angularity of said carriage.

10. Spindle carriage setting means for hobbing machines combining a tool slide member having a flat forward surface surrounding a centrally disposed annular recess; a spindle carriage having a complemental flat surface and a projecting centrally disposed portion adapted to fit said annular recess in the slide and to pivot upon the annular bearing surfaces thereby provided; means for adjusting said spindle carriage angularly on said slide about the axis of said recess, comprising a non-rotatable rack member mounted to said slide within said recess and within the plane of the annular bearing surfaces, a propelling shaft journaled in said pivotally mounted carriage and inclined relative thereto on an axis respectively transverse to the axis of rotation of said carriage and transverse to the plane of rotation thereof, the outer end of said shaft extending forward to a position accessible to the operator in all angular positions of adjustment of the carriage, means including an helicoidal gear element operatively connecting the inner end of said shaft with said rack element, and a manually operable crank means engageable with the outer end of said shaft for actuating the shaft to effect angular adjustment of said spindle carriage, said helical gear element affording a non-reversible drive and a positive lock for holding said carriage in adjusted position; and means for clamping said complemental flat surfaces firmly together in said adjusted position.

11. Control means for setting the position of the cutter of a hobbing machine combining a tool slide member, a spindle supporting carriage pivoted thereto and adjustable angularly thereon; a translatable spindle journaled in said spindle carriage on an axis perpendicular to the axis of rotation of the carriage; a cutter on said spindle; complemental annular bearing means between said carriage and tool slide members; axially translatable bearing means for said spindle; means for adjusting said cutter angularly and axially relative to said tool slide comprising an annular rack member fixed to said tool slide within the plane of said annular bearing means, a straight rack member fixed to said spindle and translatable therewith, a pair of propelling shafts journaled in said rotatable carriage arranged on axes respectively transverse to the axis of rotation of said carriage and transverse to the axis of said spindle, said shafts thereby projecting at an angle to the axis of rotation of said carriage and to the axis of the spindle to positions accessible to the operator in all angular positions of the carriage; and a manually operable means engageable with the ends of said inclined propelling shafts for operating same selectively to set said cutter in a predetermined axial position in said carriage or said cutter angularly to a predetermined position about the axis of the carriage without interference with the relatively stationary tool slide.

WILLIAM F. ZIMMERMANN.